Jan. 28, 1958        W. E. HUMMEL        2,821,487
METHOD FOR APPLYING WHITE WALL COATING TO TIRE SIDE WALLS
Filed Sept. 16, 1955
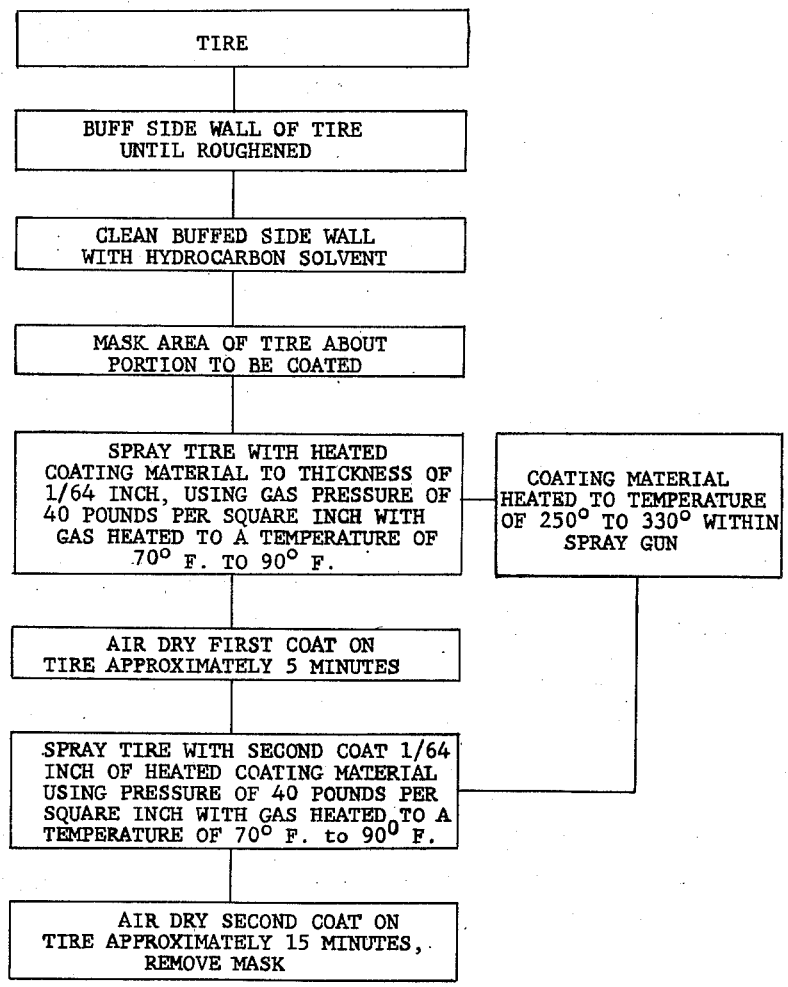
INVENTOR.
WILLIE EUGENE HUMMEL
BY
*Harry Sangram*
ATTORNEY

United States Patent Office 2,821,487
Patented Jan. 28, 1958

2,821,487

COATING SURFACE BY SPRAYING WHITE TIRE WALLS

Willie Eugene Hummel, Philadelphia, Pa.

Application September 16, 1955, Serial No. 534,864

2 Claims. (Cl. 117—38)

My invention relates to a method for applying rubber-like coatings, and more particularly relates to a method for applying a rubber base white wall coating to automobile tire side walls.

During recent years there has been a tendency to dress up automobiles by incorporating as an optional accessory for the new car purchaser, tires with white side walls. While the white wall tire has found wide acceptance by the public, the considerable increase cost of such tires as factory equipment has operated as a serious drawback to the general adoption. In addition, expensive maintenance costs have occurred in the past, since a tedious and time consuming hand operation was involved in reviving the white wall. That is, application of the refurbished white coating when the original white side wall had become scuffed, marred, or worn, not only involved painstaking care because of the special manual techniques required, but also because of short duration of the coating's useful life.

It, therefore, is an object of my invention to provide a method for applying a white rubber coating to a black tire side wall which will furnish a white tire side wall having all of the characteristics of a factory vulcanized white wall tire.

Another object of my invention is to provide a method for applying a white rubber coating by the manufacturer to a tire without molds or high temperature curing operations and having the characteristics of a factory vulcanized tire.

Another object of my invention is to provide a system for repainting or touching up a scuffed white wall tire and which can be simply and rapidly applied, thereby providing considerable economy in this type of operation.

Another object of my invention is to provide a method which enables white side wall or other coating to be applied to the walls of tires and which yields a coating layer having excellent adhesion and exterior smoothness.

Another object of my invention is to provide a method which enables rubber white side wall or other coatings to be sprayed or brushed upon the walls of tires or any surface with economy, facility, and dispatch.

Other objects of my invention are to provide an improved method for fabricating white tire side walls that is easily and economically applied, which produces a sturdy construction, and which is highly efficient in operation.

With the above and related objects in view, my invention consists in the details of application and combination of elements, as will be more fully understood from the following description:

In order to accomplish the above objects, I prefer to use a rubber coating composition of the following formulation:

Pigment: Percent
    Titanium oxide_____ 35.8
    Calcium carbonate_____ 64.2

Vehicle:
    Rubber solution_____ 49.5
    Aromatic hydro-carbons_____ 13.6
    Mineral spirits_____ 36.9

Rubber Solution:
    Natural or synthetic rubber_____ 17 to 65
    Aqueous or aromatic solvent_____ 35 to 83

In carrying out my invention, it is to be understood that extreme variations of the above composition may be utilized. For example, the rubber solution may be comprised of natural rubber or synthetic rubber such as neoprene, butadiene-styrene, or butadiene-acrylonitrile. The selection of the rubber to be used will generally correspond to the base rubber composition used in the tire itself. That is, if a butadiene-styrene tire, such as a cold rubber tire, is used, it would be preferable to use a butadiene-styrene rubber coating for best adhesion effects. Furthermore, the rubber solution may either be in a latex emulsion form or dissolved in non-polar solvents. I have also found that vinyl compositions as a substitution for rubber will produce very fine results.

It is also to be understood that the pigment composition is to be in no way restricted to titanium oxide and calcium carbonate, and other fillers, such as clay, mica, asbestos, etc. may be substituted for the calcium carbonate, and other whitening agents, such as lead dioxide and organic whiteners may be easily employed.

The procedure for spray application of the aforementioned coating composition upon a factory or new black wall tire is as follows: I buff the black side wall of the tire upon which the coating is to be applied with emery paper or cloth until the tire is considerably roughened. Garnet paper #½ is quite satisfactory for this purpose. The buffed side wall is then cleaned and prepared by wiping thoroughly with a rubber thinner such as an aromatic hydro-carbon. Examples are: benzene, toluene, xylene, gasoline, or any mixture thereof. The tire is then masked in any conventional manner, using paper or metal masking devices in order to prevent the coating from being applied to the tread or to the interior bead of the tire. However, for this masking procedure, I prefer to use masking machine described in my co-pending application, Serial No. 461,333, filed October 11, 1954.

Utilizing compressed air provided by a compressor, or any inert gas such as nitrogen or carbon dioxide from a gas cylinder, I pass the compressed gas at a pressure of approximately 40 pounds per square inch into any conventional spray gun, pressure being applied to the spray gun by direct force upon the coating within the gun container rather than by aspiration. However, prior to entrance into the spray gun, the gas or air supply is heated to 70° to 90° F. in order to compensate for gas expansion. That is, the gas or air line leading to the spray gun is heated in any conventional fashion such as by passing hot water, steam, or electric coils about the gas line.

It is in the heating operation that the major feature of my invention is involved. When cool or room temperature rubber latex or solvent compositions are sprayed, there is a tendency for the rubber to coagulate and form blisters upon the tire, and to result in poor adhesion. Passing a cool gas through the spray gun to eject the liquid coating coagulates the rubber, since the rubber is in an emulsion or colloidal state. This heating operation is also necessary as applied to the rubber composition within the spray gun itself. Therefore, the spray gun is also provided with electric or steam jacketed heating elements whereby the colloidal coating material within the gun is heated to 250° to 330° F. during the entire spraying operation. Heating the coating to 250° to 330° F. prevents the rubber from coming out of suspension when disturbed by the agitating air stream and no coagulation results.

With a new black tire, I find that two coats of the coating material are usually required, and I allow approximately a five minute air dry between coats. However, the second coating may be applied after the first coating becomes tacky. For best results, the thickness of application of each coat is approximately 1/64 of an inch, or a total thickness for the two coats is approximately 1/32 of an inch. However, considerable variation from this is permissible and coatings varying from 1/100 inch to 1/16 inch are satisfactory. The second coat is allowed to dry for 15 minutes or more, at the end of which time the white side wall tire is completed. It has also been observed that considerable variation in the number of coats may be utilized, and anywhere from one to four coats have been successful.

I have also found that the aforementioned rubber coating composition may be easily brushed upon the masked and prepared tire. The major feature again residing in the fact that the coating material is heated at a temperature from 250° to 330° F. to prevent coagulation when agitation occurs. It is also to be observed that an old, scuffed, or marred tire which already has a white side wall may be easily revived by employing identical procedures which have been illustrated above.

The techniques involved in practicing the invention set forth herein may also be applied to the spraying of a rubber coating to any surface.

Although my invention has been described in considerable detail, such description is intended as being illustrative rather than limiting, since the invention may be variously embodied, and the scope of the invention is to be determined as claimed.

I claim as my invention:

1. A method for applying a white wall coating to a tire side wall comprising the steps of buffing the tire side wall until rough, wiping said buffed side wall with an aromatic hydro-carbon solvent, masking the tire to expose only the surface upon which the white side wall is to be applied, heating a white rubber emulsified coating composition to a temperature of 250° to 330° F. within a spray gun, and introducing a compressed gas heated to a temperature of 70° to 90° F. at a pressure of 40 pounds per square inch into the spray gun and spraying two coats of rubber composition on the exposed surface of the tire, allowing the first coat to air dry until tacky before application of the second coat, allowing the second coat to air dry fifteen minutes, each coating having a thickness of 1/64 of an inch.

2. The method of applying a white wall coating to a rubber tire side wall which comprises passing a colloidal rubber coating material into an ejection means, maintaining said coating material at a temperature of between about 250°–330° F. while it is within the ejection means, and then ejecting said coating material from said ejection means by passing a pressurized gas, maintained at a temperature of about 70°–90° F., against said coating material within said ejection means.

References Cited in the file of this patent

UNITED STATES PATENTS

| | | |
|---|---|---|
| 1,448,286 | Comstock | Mar. 13, 1923 |
| 1,561,942 | Meyer | Nov. 17, 1925 |
| 1,741,997 | Lerch | Dec. 31, 1929 |
| 1,807,031 | Gibbons | May 26, 1931 |
| 2,136,567 | Smith | Nov. 15, 1938 |

FOREIGN PATENTS

| | | |
|---|---|---|
| 566,064 | Great Britain | Dec. 12, 1944 |
| 567,779 | Great Britain | Mar. 2, 1945 |